United States Patent [19]

Bilow

[11] 4,183,869

[45] Jan. 15, 1980

[54] ETHYNYL-TERMINATED EPOXY RESIN DERIVATIVES AND PROCESS FOR MAKING THE SAME

[75] Inventor: Norman Bilow, Encino, Calif.

[73] Assignee: Hughes Aircraft Company, Culver City, Calif.

[21] Appl. No.: 931,086

[22] Filed: Aug. 4, 1978

[51] Int. Cl.² ............................................. C08L 63/10
[52] U.S. Cl. .................................... 260/573; 525/113; 528/106; 528/99; 528/124
[58] Field of Search ................. 260/836, 837; 528/124

[56] References Cited

U.S. PATENT DOCUMENTS

| | | | |
|---|---|---|---|
| 3,864,309 | 2/1975 | Bilow et al. | 528/350 |
| 3,879,349 | 4/1975 | Bilow et al. | 526/242 |
| 3,928,450 | 12/1975 | Bilow et al. | 260/578 |
| 4,075,111 | 2/1978 | Bilow et al. | 252/12 |
| 4,098,767 | 7/1978 | Bilow | 428/435 |

*Primary Examiner*—Paul Lieberman
*Attorney, Agent, or Firm*—Booker T. Hogan, Jr.; W. H. MacAllister

[57] ABSTRACT

Novel thermosetting oligomers are formed by reacting epoxy prepolymers with aminoarylacetylenes. When heated to 170° C. or above, these oligomers undergo acetylenic polymerization to form resins which exhibit superior thermal and hydrolytic stability when compared to conventionally cured epoxy resins.

8 Claims, No Drawings

ETHYNYL-TERMINATED EPOXY RESIN DERIVATIVES AND PROCESS FOR MAKING THE SAME

BACKGROUND OF THE INVENTION

1. Field of the Invention

This invention relates generally to the preparation of synthetic resins exhibiting high thermal stabilities and high structural strengths. More particularly, the invention relates to the preparation of epoxy derivatives which are ethynylated hydroxylated aminated hydrocarbon oligomers.

2. Prior Art

Epoxy resins have found widespread usage in applications requiring good thermal stability, high structural strengths, and high adhesive bond strengths. Generally, epoxy resins or prepolymers are cured with aromatic amines such as m-phenylenediamine and diaminodiphenylmethane or with anhydrides such as nadic anhydride, methylnadic anhydride or phthalic anhydride. Other typical epoxy curing agents are: aliphatic amines, such as tryethylenetetramine, menthanediamine, amino ethyl piperazine and diethylenetriamine, amide amines such as the veramides and other amino compounds such as dicyandiamide.

The anhydride curing agents provide cured epoxy resins with the highest thermal stability, but the cured products are susceptible to hydrolysis by moisture. This hydrolysis is autocatalytic because acid formed during the hydrolysis speeds up the process.

In contrast, amine curing agents provide cured epoxy resins with lower thermal stability, which are not susceptible to hydrolysis. Generally, amine curing agents which act as chain extenders are polyamines. That is, there are two or more amino groups in each molecule of curing agent. A principal disadvantage of such curing agents is the rapidity of cure and/or lack of pot life at normal temperatures once the epoxy prepolymer is mixed with the amine curing agent. This disadvantage precludes premixing epoxy prepolymers with amine curing agents unless they are quick-frozen which requires refrigeration.

Applicant knows of no premixed or catalyzed epoxy resins which exhibit high thermal stability, good structural strength, good processing characteristics, virtually indefinite shelf life without concern for premature polymerization, and thus the desirability of providing the same is manifest.

SUMMARY OF THE INVENTION

It is therefore an object of this invention to provide a new class of heat curable prepolymers that can be made from ordinary epoxy resins. Other objectives of this invention are: to provide a new class of cured resins which are more hydrolytically stable than anhydride cured epoxy resins while retaining high heat resistance characteristics; to provide a new method of curing epoxy resins; to provide cured epoxy resins which have outstanding thermal stability; to provide readily processible, soluble and fusible prepolymers useful in the fabrication of high strength filled or reinforced composite structures; to provide epoxy based oligomers which cure at temperatures above 170°-200° C.; and to provide one-component epoxy-based oligomers which cure by heat alone without the addition of a curing agent at the time of use.

In meeting the above-stated objectives, a new class of thermosetting oligomers has been invented which cure at temperatures above 170°-200° C. to form hard, thermally stable resins of exceptional structural strengths.

These new oligomers are the reaction products of aminoarylacetylenes and di- or polyfunctional-epoxy-arylenes or alkylenes.

The reactants are simply mixed in the proper proportion and stirred at temperatures ranging from 100°-140° C. to cause the epoxy groups to disappear—thereby forming molten oligomers which may solidify when allowed to cool. These oligomers are are then curable into useful resins upon reheating to 170°-250° C. or above for from 1 to 24 hours.

DETAILED DESCRIPTION OF THE INVENTION

It has been discovered that di-epoxy and poly-epoxy prepolymers, whose structures are:

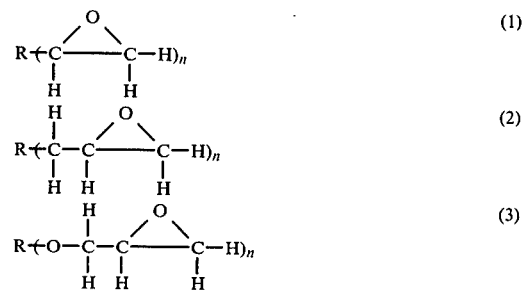

where n may be from 2 to 10 and is usually 2 to 4 and R may be an aliphatic or aromatic moiety, alkylene, arylene, alkylarylene, arylalkylene, alkylene oxyalkylene, arylene oxyalkylene, diarylene, triarylene, arylalkylene oxyarylalkylene, haloarylene and halo-, oxy-, amino- or thio-substituted analogues of said moieties where the alkyl substituent groups may contain from 1 to 10 carbon atoms and the alkylene moieties contain from 1 to 10 carbon atoms in their chain, will react with aminoarylacetylenes, whose structures are:

where Ar is phenylene, phenyleneoxyphenylene, phenylenethiophenylene, phenylene oxyphenylene oxyphenylene, biphenylene, naphthylene, or terphenylene, and R' may be either H or alkyl, to form oligomers whose formulas are:

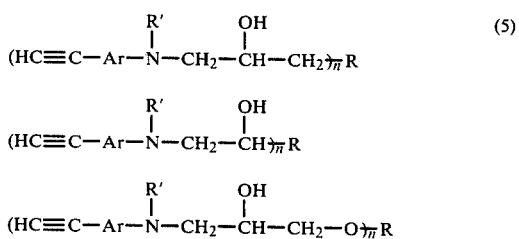

where Ar, R and R' are as defined above. Other amino ethynyl compounds can also be utilized in combination with the epoxy prepolymers shown above to form oligomers whose structures are analogous to that shown at (5).

Oligomers of formula (5) are curable to thermally stable high strength resins, which exhibit excellent hydrolytic stability, by heat alone which promotes acetylenic polymerization. When cured, the oligomers of this invention yield resins which contain dimerized or trimerized acetylene units.

Preferred curing temperatures are from 220° to 250° C. However, temperatures as low as 170°–180° C. may be used if a sufficiently long cure duration is used.

These thermosetting oligomers may be defined as ethynyl-terminated epoxy resin derivatives or as ethynyl-terminated hydroxy substituted, amino substituted hydrocarbons. Since the epoxy terminal groups are no longer present, the oligomers are not curable with polyamino compounds or dianhydrides as are conventional epoxy prepolymers.

Thermogravimetric analyses of cured epoxy resins prepared via the process of this invention and of epoxy resins cured via conventional anhydride or amino curing agents show that this invention yields resins which are more stable than the latter. This is significant when one considers that anhydride cured epoxy resins are generally regarded as the most stable of the epoxy resins.

Typical oligomers of this invention may be prepared in accordance with the following examples:

EXAMPLE I m-Aminophenylacetylene (1.15 g., 0.00983 mole) was blended with the diglycidyl ether of bisphenol A known as Epon 828 (1.71 g, 0.00463 mole, Shell Chem. Co.). The mixture was heated at 120°–140° C. for about 6½ hours, although the reaction seemed to be complete in about 1–2 hours. Complete reaction is evidenced by the disappearance of the epoxy groups as determined by IR analysis or other analytical methods. The oligomer was molten since its melting point was around 40° C. When cooled, the oligomer solidified and was very hard. When a sample was gradually heated to 250° C., it first gelled and then cured to a hard impact-resistant thermoset resin. When heating was continued to 300° C. no visual evidence of decomposition was noted other than some darkening in color (if air was present). The excellent thermal stability was supported by the thermogravimetric analysis shown in FIG. 1.

EXAMPLE II

A similar reaction was run with Epon 825. In this case, 1.17 g (0.010 mole) of m-aminophenylacetylene was used and 1.70 g (0.005 mole) of Epon 825 was used. The mixture was heated for 2 hours at 130° C. Its ability to cure was verified on a melting point block. Cure was noted at 220°–240° C.

EXAMPLE III

Epon 825 (1.70 g, 0.005 mole) was mixed with 3-amino-3'-ethynyl diphenylether (2.09 g, 0.01 mole). The reactants were mixed and stirred at 125°–135° C. for 2½ hours, then cooled. A sample of the oligomer was tested on a melting point block and found to cure readily at 250° C.

Structures

The chemical structure of the oligomer made in Example I or II is primarily shown as:

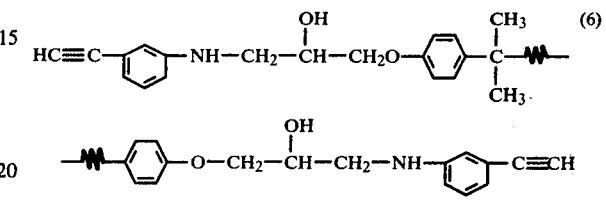

The chemical structure of the oligomer made in Example III is shown as

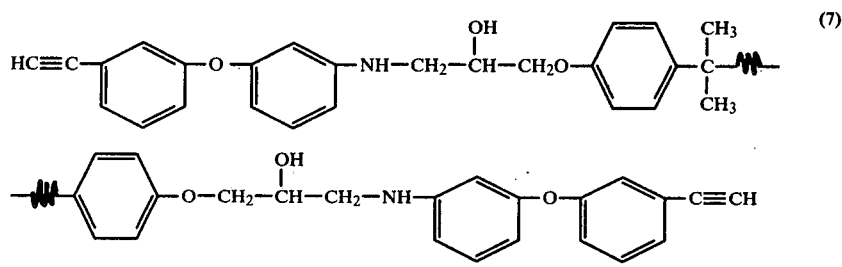

Having fully disclosed my invention and provided teachings which enable others to make and use the same, the scope of my claims may now be understood as follows.

What is claimed is:

1. A process for ethynylating polyfunctional epoxy prepolymers to form one component, long shelf life thermosetting resins comprising the steps of:
   (a) premixing said prepolymers with a stoichiometric amount of an aminoarylacetylene;
   (b) causing the epoxy groups on said prepolymers to completely react with said aminoarylacetylene by raising the temperature of said premix to about 120°–140° C. with agitation for a period ranging from 1 to about 8 hours whereby a molten acetylene terminated oligomer is formed; and
   (c) allowing said molten oligomer to cool to ambient temperatures.

2. The process of claim 1 wherein said aminoarylacetylene is selected from the group consisting of aminophenylacetylene, aminophenoxyphenylacetylene, aminophenylthiophenyl acetylene, aminophenoxyphenoxyphenylacetylene, aminobiphenylacetylene, aminonapthylacetylene and aminoterphenylacetylene.

3. The process of claim 1 wherein said polyfunctional epoxy prepolymer is the glycidyl ether of bisphenol A.

4. The process of claim 3 wherein said aminoarylacetylene is selected from the group consisting of aminophenylacetylene, aminophenoxyphenylacetylene, aminophenylthiophenylacetylene, aminophenoxyphenylacetylene, aminobiphenylacetylene, aminonapthylacetylene, aminoterphenylacetylene and N-alkyl substituted derivatives thereof.

5. The process of claim 4 wherein said aminoarylacetylene is aminophenylacetylene.

6. A class of thermosetting ethynyl-terminated epoxy resin derivatives whose structural formula are

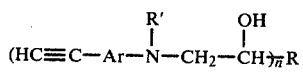

where R' is H or alkyl and where n may range from 2 to 4, Ar may be a moiety selected from the group consisting of phenylene, phenyleneoxyphenylene, phenylenethiophenylene, phenyleneoxphenyleneoxyphenylene, biphenylene, napthylene, and terphenylene and R may be methyleneoxyphenyleneisopropylidenephenyleneoxymethylene or a moiety selected from the group consisting of alkylene, arylene, alkylarylene, arylalkylene, alkyleneoxyalkylene, aryleneoxyalkylene, diarylene, triarylene, arylalkylene exyaryalkylene, haloarylene, various halo-, oxy-, amino- or thio-substituted analogous of said arylenes and alkylenes, and moieties of partially homopolymerized derivates of the indicated epoxy compounds.

7. A thermosetting resin from claim 6 wherein Ar is phenylene, R' is hydrogen or an alkylene whose chain length runs from 1 to about 10 carbon atoms, R is methyleneoxyphenylenyleneisopropylideneoxymethylene and n is 2.

8. A thermosetting resin of claim 6 wherein Ar is phenyleneoxyphenylene, R' is hydrogen or an alkylene whose chain length runs from 1 to about 4 carbon atoms, R is methyleneoxyphenylenyleneisopropylideneoxymethylene and n is 2.

* * * * *